(12) United States Patent  
Tang et al.

(10) Patent No.: US 11,203,891 B2  
(45) Date of Patent: Dec. 21, 2021

(54) ANTI-PINCH WINDOW CONTROL SYSTEM AND ANTI-PINCH WINDOW CONTROL METHOD

(71) Applicant: SOUTHERN TAIWAN UNIVERSITY OF SCIENCE AND TECHNOLOGY, Tainan (TW)

(72) Inventors: Ching-Chou Tang, Tainan (TW); Yu-Chi Hsieh, Tainan (TW); Kun-Yu Li, Tainan (TW); Jhih-Deng Hong, Tainan (TW); Liang-Chi Dai, Tainan (TW); Sheng-Kai Huang, Tainan (TW); Qing-Yuan Huang, Tainan (TW); Jui-Cheng Kao, Tainan (TW)

(73) Assignee: Southern Taiwan University of Science and Technology, Tainan (TW)

( * ) Notice: Subject to any disclaimer, the term of this patent is extended or adjusted under 35 U.S.C. 154(b) by 0 days.

(21) Appl. No.: 16/867,822

(22) Filed: May 6, 2020

(65) Prior Publication Data

US 2021/0348432 A1 Nov. 11, 2021

(51) Int. Cl.
*E05F 15/00* (2015.01)
*E05F 15/40* (2015.01)
*B60J 1/17* (2006.01)
*B60J 1/20* (2006.01)

(52) U.S. Cl.
CPC ............... *E05F 15/40* (2015.01); *B60J 1/17* (2013.01); *B60J 1/20* (2013.01); *E05Y 2400/52* (2013.01); *E05Y 2900/55* (2013.01)

(58) Field of Classification Search
CPC .... E05F 15/41; E05F 15/695; E05Y 2900/55; H02H 7/0851; H02H 7/0816
USPC ................................ 49/26, 31; 318/469, 286
See application file for complete search history.

(56) References Cited

U.S. PATENT DOCUMENTS

| 7,259,532 | B2 * | 8/2007 | Shinohara | ............... H02P 7/245 318/282 |
| 7,268,506 | B2 * | 9/2007 | Nakagawa | ........... H02H 7/0851 318/280 |
| 8,627,600 | B2 * | 1/2014 | Gao | ........................ E05F 15/42 49/26 |
| 2001/0030520 | A1 * | 10/2001 | Losey | ................. G01M 15/044 318/445 |
| 2005/0276449 | A1 * | 12/2005 | Pedemas | ............... E05F 15/431 382/104 |

(Continued)

FOREIGN PATENT DOCUMENTS

| CN | 1078334 C | 10/1998 |
| CN | 101544173 A | 9/2009 |

(Continued)

*Primary Examiner* — Chi Q Nguyen
(74) *Attorney, Agent, or Firm* — Rosenberg, Klein & Lee

(57) ABSTRACT

An anti-pinch window control system and an anti-pinch window control method are disclosed. The anti-pinch window control system includes a door panel, a glass window, a sound detection module, and a control module. When the glass window is closing, if a sound position of a sound on the glass window is close to an end portion of the glass window, the control module controls the glass window to stop closing. The sound on the glass window serves as the main judgment standard for the anti-pinch window control system, which can reduce the possibility of misjudgment.

10 Claims, 8 Drawing Sheets

(56) References Cited

U.S. PATENT DOCUMENTS

| | | | | |
|---|---|---|---|---|
| 2006/0028162 A1* | 2/2006 | Iwasaki | ............... | E05F 15/695 318/466 |
| 2006/0288642 A1* | 12/2006 | Marentette | ............ | H02K 11/24 49/26 |
| 2007/0052293 A1* | 3/2007 | Shibata | ............... | H02H 7/0851 307/10.1 |
| 2007/0236161 A1* | 10/2007 | Pebre | .................. | H02H 7/0851 318/469 |
| 2008/0074067 A1* | 3/2008 | Rhodes | ............... | E05F 15/431 318/280 |
| 2019/0071914 A1* | 3/2019 | Bars | ..................... | E05F 15/689 |
| 2020/0031207 A1* | 1/2020 | Henes | ..................... | B60J 1/17 |

FOREIGN PATENT DOCUMENTS

| | | |
|---|---|---|
| CN | 104806116 A | 7/2015 |
| CN | 208216602 U | 12/2018 |
| CN | 208484510 U | 2/2019 |

* cited by examiner

ANTI-PINCH WINDOW CONTROL SYSTEM AND ANTI-PINCH WINDOW CONTROL METHOD

FIELD OF THE INVENTION

The present invention relates to an anti-pinch window control system and an anti-pinch window control method, and more particularly to an anti-pinch window control system and an anti-pinch window control method using a sound detection.

BACKGROUND OF THE INVENTION

Nowadays most vehicles use electronic switches to control the opening and closing of windows. However, if the switch is accidentally touched, the user may be pinched by the windows.

Chinese Patent Publication No. CN 104806116 discloses an intelligent anti-pinch window control method and apparatus, mainly using an automatic optimization control system for monitoring obstacles through infrared sensors and transmitting signals to a main control module through a data processing module to control the opening and closing of windows, so as to reduce injuries caused by windows.

The aforementioned patent only uses infrared beam to judge whether the user in the car is close to the window. If the user is detected approaching the window, the window closing command will be stopped first. However, if there is an approaching object outside the vehicle window, it may make a misjudgment. The window stops closing even if the user in the vehicle does not approach the window. The user in the vehicle needs to re-operate the switch to close the window, which will cause inconvenience to the user in the vehicle. Accordingly, the inventor of the present invention has devoted himself based on his many years of practical experiences to solve these problems.

SUMMARY OF THE INVENTION

The primary object of the present invention is to provide an anti-pinch window control system to improve the accuracy of judgment. The anti-pinch window control system comprises a door panel, a glass window, a sound detection module, and a control module. The door panel has a window opening and an abutment edge adjacent to the window opening. The glass window is disposed on the door panel. The glass window has an end portion corresponding to the abutment edge. The window opening is opened or closed by moving the end portion to be abutted against the abutment edge or away from the abutment edge. The sound detection module is disposed on the glass window. The sound detection module is configured to detect a sound position of a sound on the glass window. The control module is in signal connection with the sound detection module. The control module controls the glass window by means of a signal. When the glass window is closing to move the end portion of the glass window toward the abutment edge, if the sound position is close to the end portion, the control module controls the glass window to stop closing.

Preferably, the sound position close to the end portion means that a distance between the sound position and the end portion is within 15 cm.

Preferably, the anti-pinch window control system further comprises a prompting module that is in signal connection with the control module. When the glass window is closing to move the end portion of the glass window toward the abutment edge, if the sound position is far from the end portion, the control module controls the prompting module to output a prompting message.

Preferably, the anti-pinch window control system further comprises a touch sensing module that is in signal connection with the control module. The touch sensing module is disposed on the glass window. When the glass window is closing to move the end portion of the glass window toward the abutment edge, if the sound position is close to the end portion and the touch sensing module is triggered, the control module controls the glass window to stop closing.

Preferably, the anti-pinch window control system further comprises an infrared sensing module that is in signal connection with the control module. The infrared sensing module is disposed close to the glass window. When the glass window is closing to move the end portion of the glass window toward the abutment edge, if the sound position is close to the end portion and the infrared sensing module is triggered, the control module controls the glass window to stop closing.

According to another aspect of the present invention, an anti-pinch window control method is provided. The anti-pinch window control method comprises providing a sound detection module to detect a sound position of a sound on a glass window. When the glass window is closing to move an end portion of the glass window toward an abutment edge of a door panel, if the sound position is close to the end portion, a control module controls the glass window to stop closing.

Preferably, the sound position close to the end portion means that a distance between the sound position and the end portion is within 15 cm.

Preferably, when the glass window is closing to move the end portion of the glass window toward the abutment edge, if the sound position is far from the end portion, the control module controls a prompting module to output a prompting message.

Preferably, when the glass window is closing to move the end portion of the glass window toward the abutment edge, if the sound position is close to the end portion and a touch sensing module is triggered, the control module controls the glass window to stop closing.

Preferably, when the glass window is closing to move the end portion of the glass window toward the abutment edge, if the sound position is close to the end portion and an infrared sensing module is triggered, the control module controls the glass window to stop closing.

According to the above technical features, the following effects can be achieved.

1. The sound on the glass window serves as the main judgment standard for the anti-pinch window control system, which improves the accuracy, is less susceptible to the external environment and reduces the possibility of misjudgment.

2. Through the sound detection module, when the glass window is closing, if a user puts his/her hand on the end portion of the glass window, the control module immediately stops the closing of the glass window, so as to prevent the user from being pinched by the glass window.

3. When the user places his/her hand on the glass window away from the end portion, the prompting module will output a prompting message, which will also be noticed by other users.

4. In addition to the sound detection module, it can be equipped with a touch sensing module and/or an infrared sensing module to further improve the accuracy and to avoid misjudgment of a single sensing manner.

DETAILED DESCRIPTION OF THE PREFERRED EMBODIMENTS

Embodiments of the present invention will now be described, by way of example only, with reference to the accompanying drawings.

Figure 1:
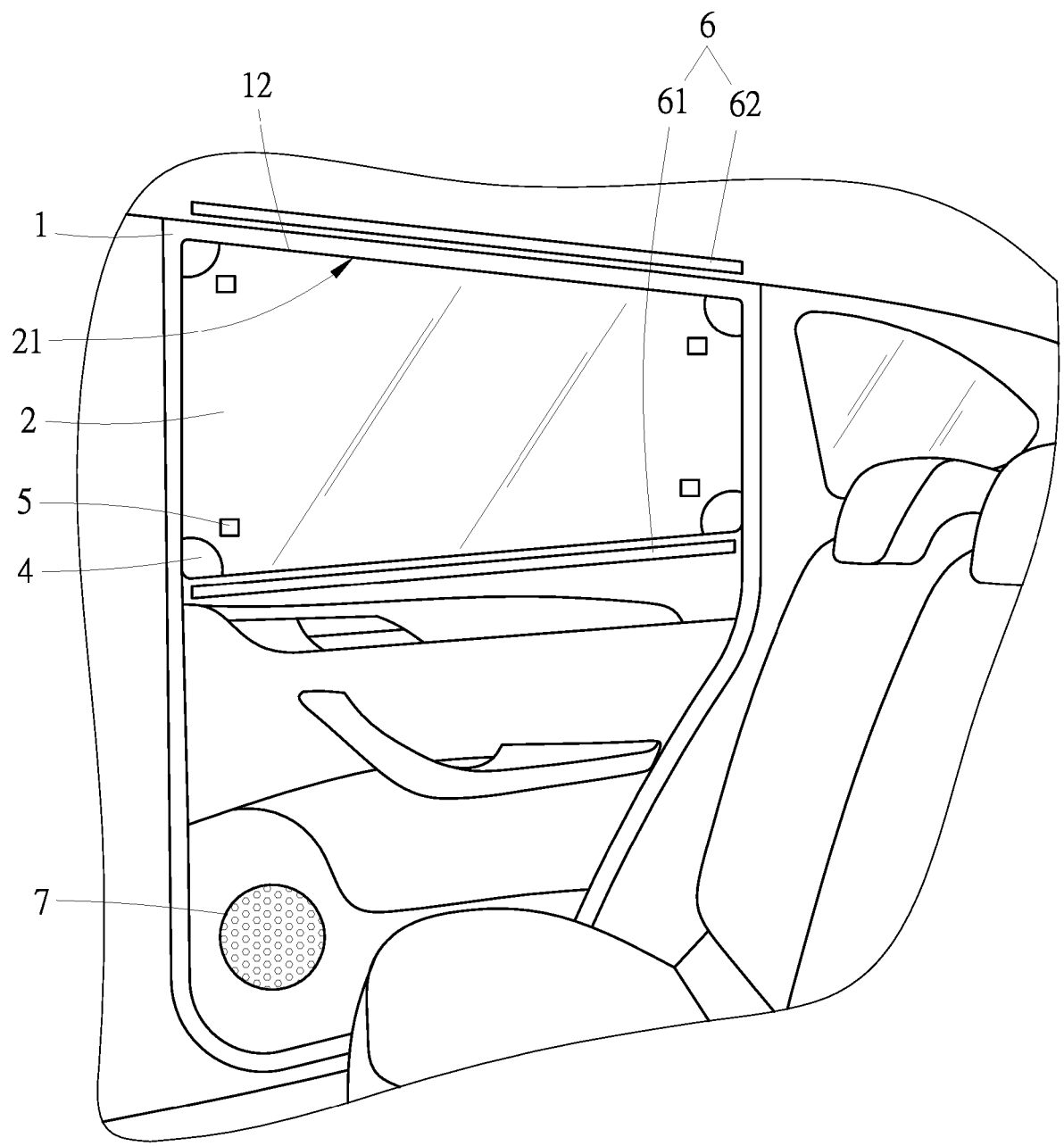
FIG. 1 is a schematic view according to an embodiment of the present invention.
Figure 2:
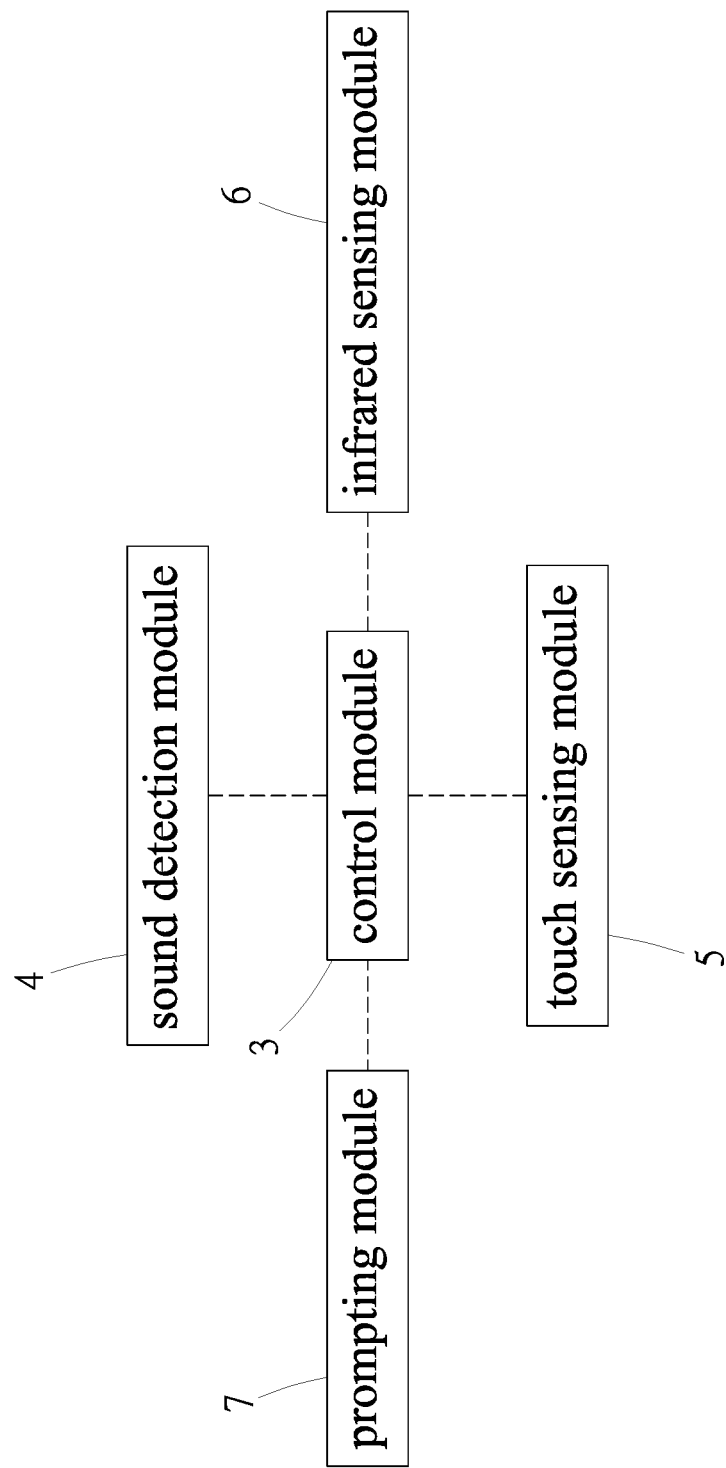
FIG. 2 is a block diagram of the embodiment of the present invention.

As shown in FIG. 1 and FIG. 2, the present invention discloses an anti-pinch window control system. The anti-pinch window control system is disposed on a vehicle. The anti-pinch window control system comprises a door panel (1), a glass window (2), a control module (3), a sound detection module (4), a touch sensing module (5), an infrared sensing module (6), and a prompting module (7).

The door panel (1) has a window opening (11) and an abutment edge (12). As to the window opening (11), please refer to FIG. 4. The abutment edge (12) is adjacent to the window opening (11).

The glass window (2) is disposed on the door panel (1). The glass window (2) has an end portion (21) corresponding to the abutment edge (12). The window opening (11) is opened or closed by moving the end portion (21) to be abutted against the abutment edge (12) or away from the abutment edge (12).

The control module (3) may be in combination with a trip computer of the vehicle, or may be in signal connection with the trip computer in a wired or wireless manner. The control module (3) is in signal connection with the sound detection module (4), the touch sensing module (5), the infrared sensing module (6) and the prompting module (7).

The sound detection module (4) is disposed at four corners of the glass window (2). The sound detection module (4) may be a sound capturing device to capture the sound on the glass window (2) for detecting a sound position of the sound on the glass window (2).

The touch sensing module (5) may be a projected capacitive touch sensing module, with sensing electrodes provided at the four corners of the glass window (2) and a transparent conductive film (Indium Tin Oxide) combined with the glass window (2). When a charged human body comes into touch with the electrostatic conductive film, the capacitance of the ITO layer changes, an induced current is generated, and the touch coordinates are detected by the induced current. However, the detailed structure is not shown in the drawings, and the touch sensing module (5) is only illustrated by the sensing electrodes at the corners of the glass window (2).

An infrared emitting end (61) and an infrared receiving end (62) of the infrared sensing module (6) may be respectively arranged on the door panel (1) above and below the glass window (2), or on the left and right door part of the panel (1), so that the infrared beam from the infrared emitting end (61) to the infrared receiving end (62) can cover the area of the glass window (2).

The prompting module (7) is configured to output a prompting message by means of sound, video or light. In this embodiment of the present invention, the prompting module (7) is in combination with a speaker of the vehicle.

Figure 3:
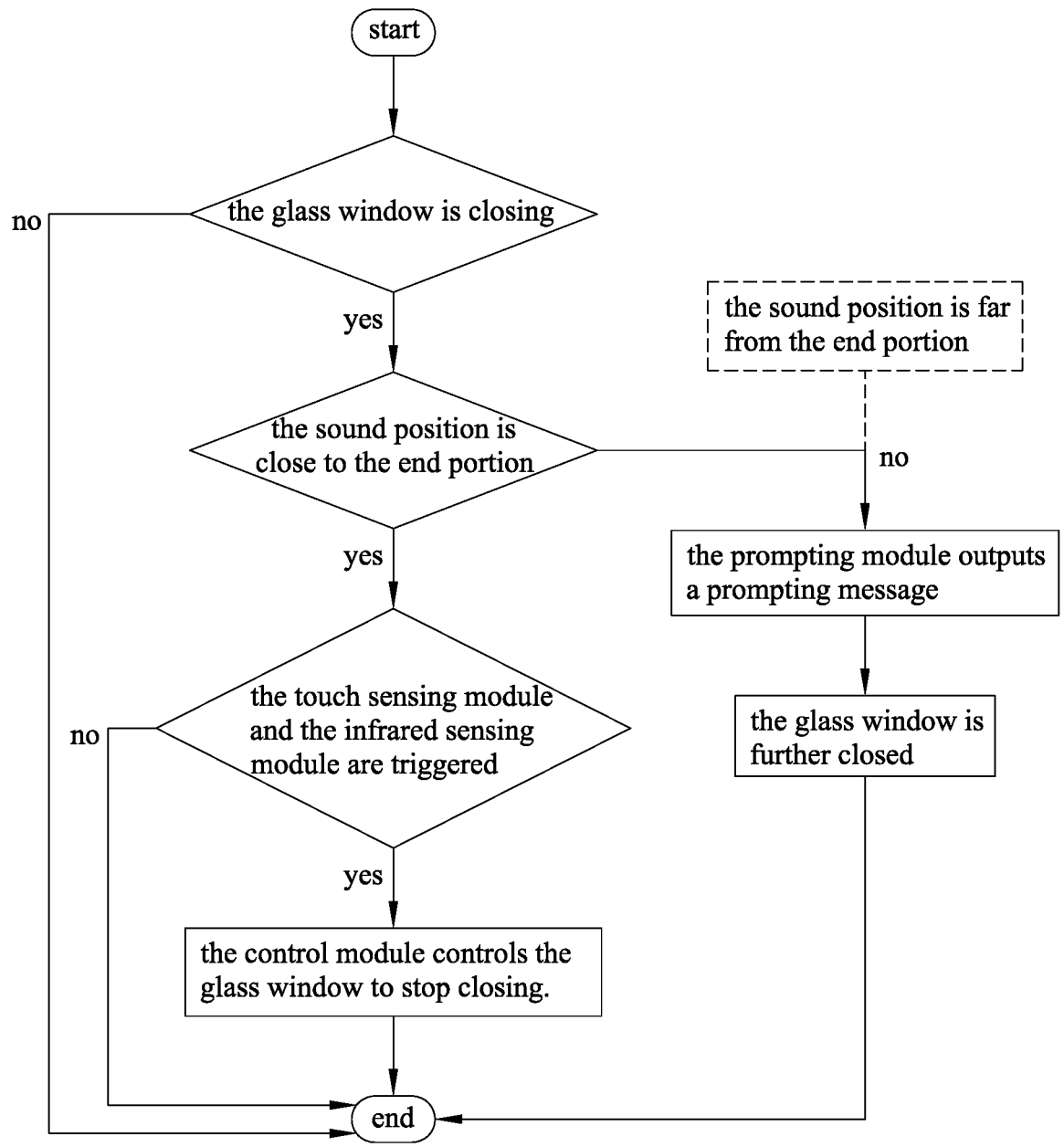
FIG. 3 is a flowchart of the embodiment of the present invention.
Figure 4:
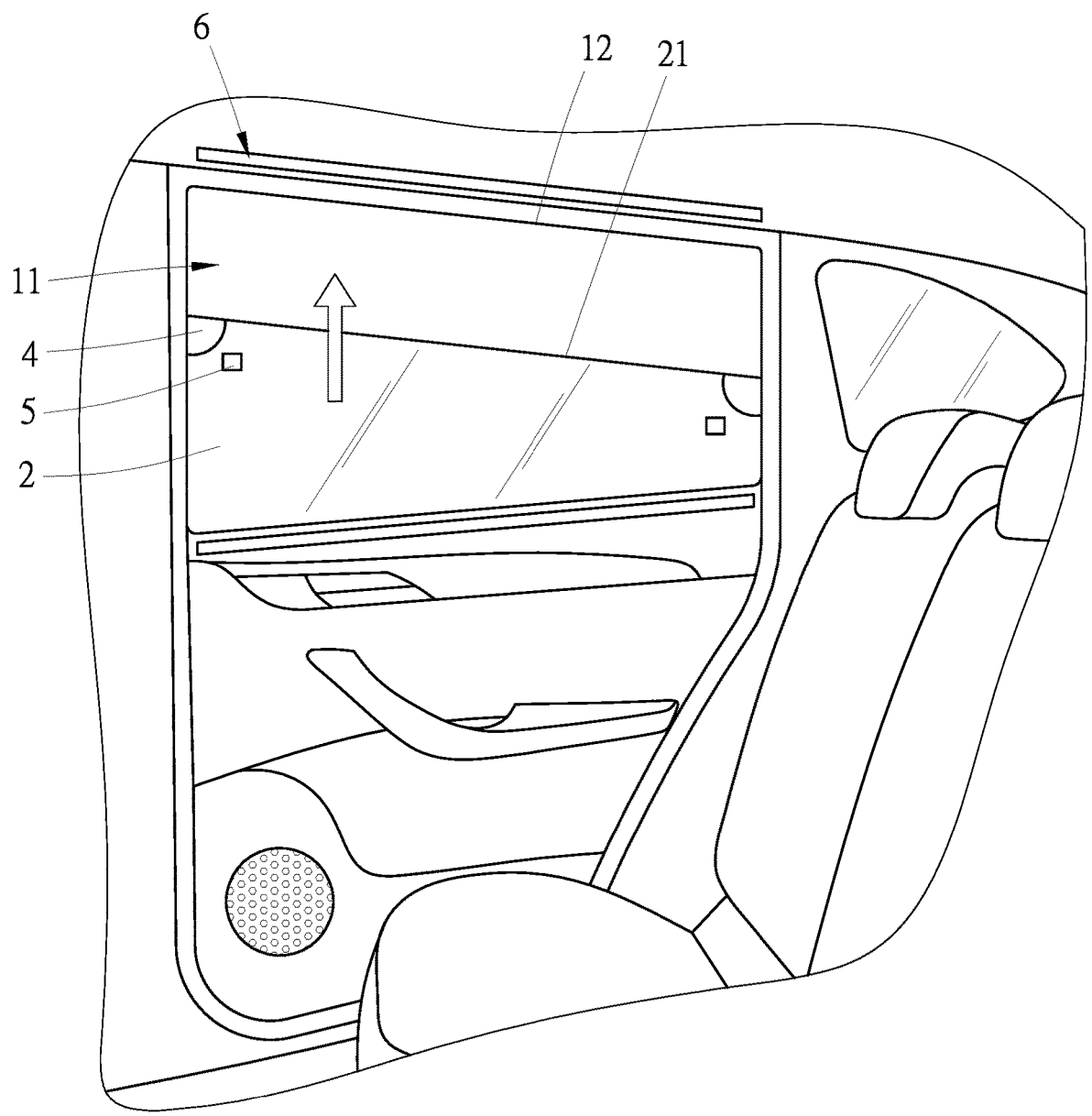
FIG. 4 is a first schematic view showing the operation of the embodiment of the present invention, illustrating that the glass window is closing.
Figure 5:
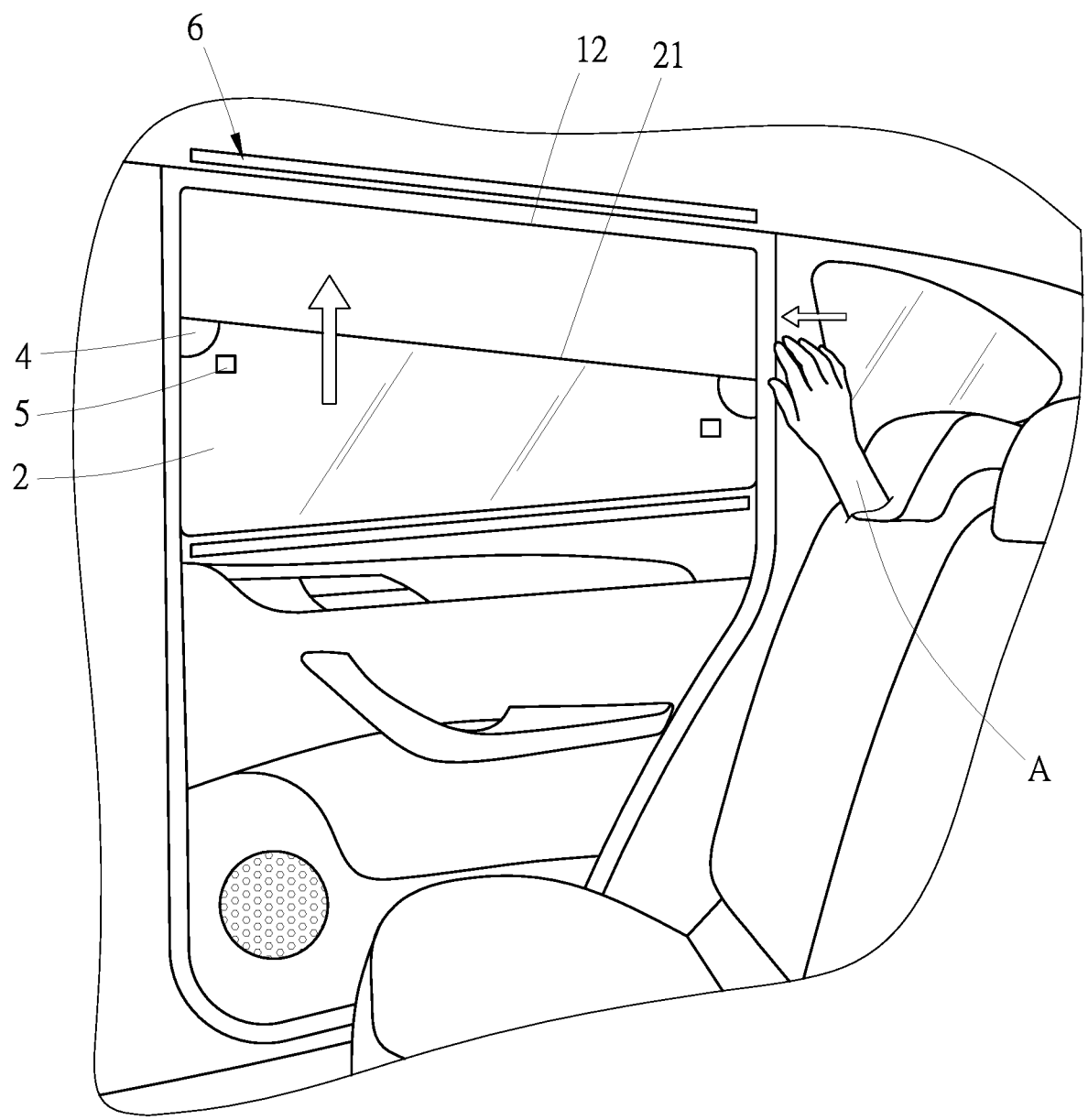
FIG. 5 is a second schematic view showing the operation of the embodiment of the present invention, illustrating that the user's hand approaches the end portion.

Please refer to FIG. 3 through FIG. 5. The anti-pinch window control system can be used to perform an anti-pinch window control method. When the glass window (2) is closing to move the end portion (21) toward the abutment edge (12), the anti-pinch window control method can be in response to a user (A) putting his/her hand near the glass window (2). First, the situation that the user (A) touches the glass window (2) near the end portion (21) will be described.

Figure 6:
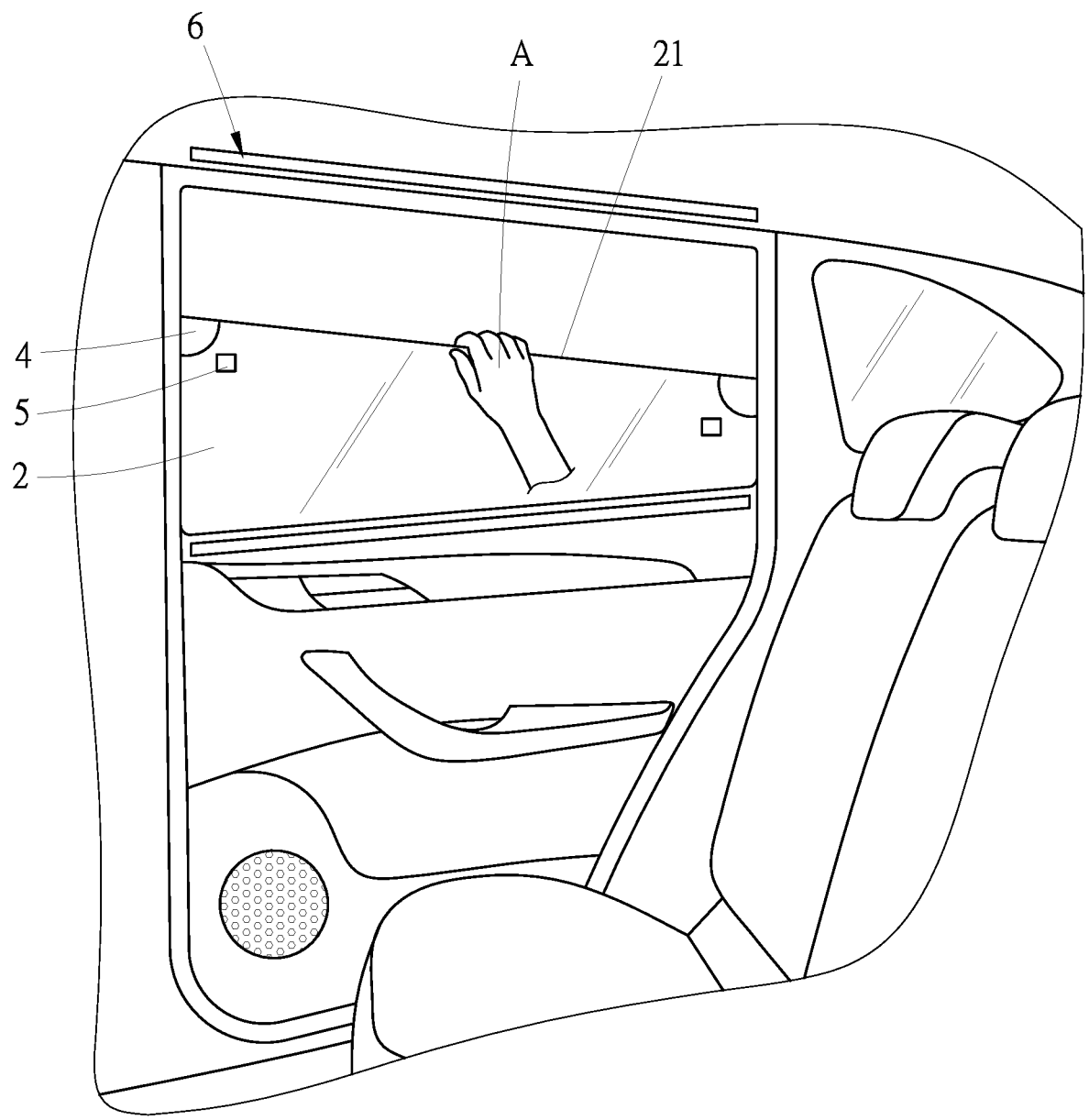
FIG. 6 is a third schematic view showing the operation of the embodiment of the present invention, illustrating that the user places his/her hand on the end portion and the glass window stops closing.

Please refer to FIG. 3, FIG. 5 and FIG. 6. When the user (A) touches the glass window (2) near the end portion (21) to sound on the glass window (2), the sound detection module (4) will detect that the sound position of the sound is close to the end portion (21). At the same time, because the user (A) has a charge on his/her hand, the touch sensing module (5) will be triggered when he/she touches the glass window (2). The user's (A) hand will block part of the infrared beam, so that the infrared sensing module (6) will be triggered. The sound position is close to the end portion (21), which means that the distance between the sound position and the end portion (21) is within 15 cm.

Please refer to FIG. 2, FIG. 3 and FIG. 6. At this time, since the sound detection module (4) detects that the sound position is close to the end portion (21) and the touch sensing module (5) and the infrared sensing module (6) are triggered, the control module (3) will control the glass window (2) to stop closing immediately, so as to prevent the glass window (2) from pinching the user (A). Through three sensing manners, the accuracy of the anti-pinch window control system will be greatly improved, thereby avoiding the single sensing manner being easily misjudged by changes in external environmental factors, and avoiding the trouble that the user needs to continuously re-operate the glass window (A) due to misjudgment. In actual implementation, it may be a combination of two of the sensing manners, such as the sound detection module (4) in cooperation with the touch sensing module (5) or the sound detection module (5) in cooperation with the infrared sensing module (6), or only the sound detection module (4) is used to detect the sound on the glass window (2).

Please refer to FIG. 1, FIG. 2 and FIG. 6. In this embodiment of the present invention, three sensing manners are used. When only the sound detection module (4) detects the sound position, but one of the touch sensing module (5) and the infrared sensing module (6) is not triggered, the control module (3) will judge that the sound detection module (4) makes a misjudgment, alternatively, when the sound detection module (4) does not detect the sound position, but one of the touch sensing module (5) and the infrared sensing module (6) is triggered, the control module (3) will also judge that the sound detection module (4) makes a misjudgment. For example, when the door panel (1) adjacent to the glass window (2) is tapped, the sound detection module (4) may make a misjudgment that there is a sound on the glass window (2). However, since neither the touch sensing module (5) nor the infrared sensing module (6) is triggered, the control module (3) judges that the sound detection module (4) makes a misjudgment. When the user (A) inside the vehicle smokes, the smoke may cause the infrared sensing module (6) to be triggered, but at this time, the sound detection module (4) and the touch sensing module (5) are not triggered, so the control module (3) judges that the infrared sensing module (6) makes a misjudgment. When the user (A) approaches the door panel (1) or the glass window (2) using an electric field or a magnetic field, the induction of the touch sensing module (5) may be affected to trigger the touch sensing module (5), but since the user (A) does not touch the glass window (2), neither the sound detection module (4) nor the infrared sensing module (6) is triggered, so the control module (3) judges that the touch sensing module (5) makes a misjudgment. As can be seen from the above examples, the present invention can definitely improve the accuracy of the anti-pinch window control system through the combination of the three sensing manners. However, the above scenarios are not shown in the drawings, and are simply described in text.

Figure 7:
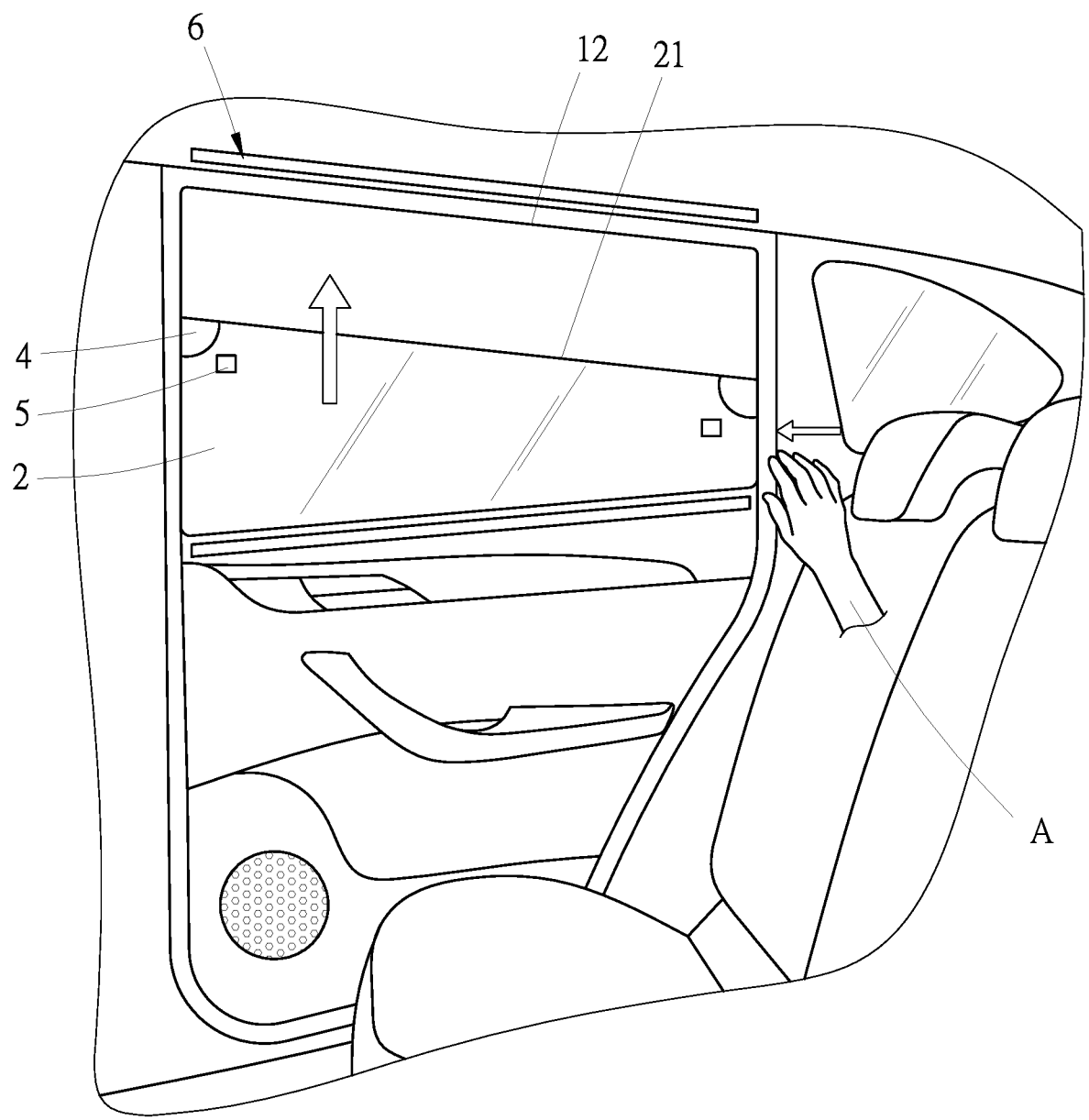
FIG. 7 is a fourth schematic view showing the operation of the embodiment of the present invention, illustrating that the user's places approach the glass window away from the end portion.

Please refer to FIG. 3, FIG. 4 and FIG. 7. When the glass window (2) is closing to move the end portion (21) toward the abutment edge (12), the following describes the situation that the user (A) touches the glass window (2) away from the end portion (21).

Figure 8:
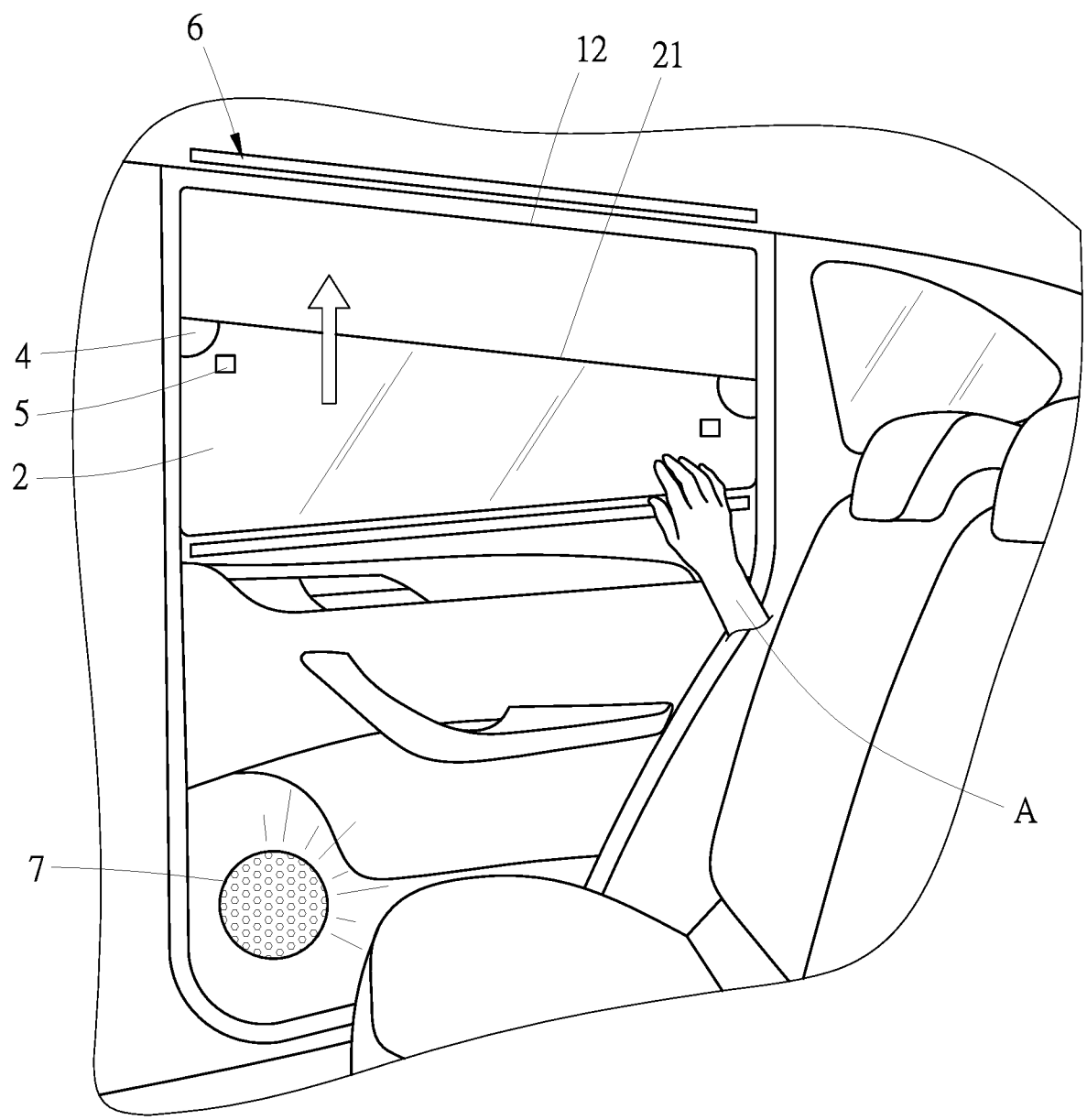
FIG. 8 is a fifth schematic view showing the operation of the embodiment of the present invention, illustrating that when the user places his/her hand on the glass window away from the end portion, the prompting module outputs a prompting message.

Please refer to FIG. 3, FIG. 7 and FIG. 8. When the hand of the user (A) approaches the glass window (2) and touches the glass window (2) away from the end portion (21), such as the bottom of the glass window (2), to sound on the glass window (2), the sound detection module (4) will detect that the sound position of the sound is far from the end portion (21). At the same time, because the user (A) has a charge on his/her hand, the touch sensing module (5) will be triggered when he/she touches the glass window (2). The hand of the user (A) will block part of the infrared beam, so that the infrared sensing module (6) will be triggered.

Please refer to FIG. 2, FIG. 3 and FIG. 8. At this time, since the sound detection module (4) detects that the sound position is far from the end portion (21) and the touch sensing module (5) and the infrared sensing module (6) are triggered, the control module (3) will control the prompting module (7) to output a prompting signal, such as a warning sound, or to remind the user (A) to leave his/her hand out of the glass window (2) by voice. The glass window (2) is further closed for the end portion (21) to abut against the abutment edge (12). When the prompting module (7) outputs the prompting signal, in addition the user (A) touching the glass window (2), other users (A) who are also inside the vehicle can notice that the user (A) puts his/her hand on the glass window (2).

It should be noted that the anti-pinch window control method is used when the glass window (2) is closing. When the glass window (2) is opening, that is, when the end portion (21) is moved away from the abutment edge (12), or when the glass window (2) is not moved, the glass window (2) is less prone to pinch the user (A). Therefore, there is no need to use the anti-pinch window control method to prevent the user (A) from being pinched.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An anti-pinch window control system, comprising:
   a door panel, having a window opening and an abutment edge adjacent to the window opening;
   a glass window, disposed on the door panel, the glass window having an end portion corresponding to the abutment edge, wherein the window opening is opened or closed by moving the end portion to be abutted against the abutment edge or away from the abutment edge;
   a sound detection module, disposed on the glass window, the sound detection module being configured to detect a sound position of a sound on the glass window; and
   a control module, being in signal connection with the sound detection module, the control module controlling the glass window by means of a signal;
   wherein the control module is configured to stop displacement of the end portion of the glass window toward the abutment edge responsive to the sound detection module detecting the sound position of a sound on the glass window being in a certain proximity to the end portion of the glass window.

2. The anti-pinch window control system as claimed in claim 1, wherein the certain proximity to the end portion of the glass window is a distance between the sound position and the end portion of the glass window being within 15 cm.

3. The anti-pinch window control system as claimed in claim 2, further comprising a prompting module in signal connection with the control module; wherein the control module is configured to control the prompting module to output a prompting message responsive to displacement of the end portion of the glass window toward the abutment edge and the sound detection module detecting the sound position of a sound on the glass window being outside the certain proximity to the end portion of the glass window.

4. The anti-pinch window control system as claimed in claim 2, further comprising a touch sensing module that is in signal connection with the control module, the touch sensing module being disposed on the glass window; wherein the control module is configured to stop displacement of the end portion of the glass window edge responsive to the touch sensing module being triggered.

5. The anti-pinch window control system as claimed in claim 2, further comprising an infrared sensing module that is in signal connection with the control module, the infrared sensing module being disposed close to the glass window; wherein the control module is configured to stop displacement of the end portion of the glass window edge responsive to the infrared sensing module being triggered.

6. An anti-pinch window control method, comprising:
   providing a sound detection module to detect a sound position of a sound on a glass window;
   detecting, by the sound detection module, that the sound position of a sound on the glass window being in a certain proximity to the end portion of the glass window;
   transmitting a signal from the sound detection module to a control module, the signal indicating that the sound position of the sound is in a certain proximity to the end portion; and stopping, by the control module, displacement of the glass window toward an abutment edge of a door panel responsive to the signal.

7. The anti-pinch window control method as claimed in claim 6, wherein the certain proximity to the end portion of the glass window is a distance between the sound position and the end portion of the glass window being within 15 cm.

8. The anti-pinch window control method as claimed in claim 7, wherein the control module is configured to control a prompting module to output a prompting message responsive to displacement of the end portion of the glass window toward the abutment edge and the sound detection module detecting the sound position of a sound on the glass window being outside the certain proximity to the end portion of the glass window.

9. The anti-pinch window control method as claimed in claim 7, wherein the control module is configured to stop displacement of the end portion of the glass window edge responsive to a touch sensing module being triggered.

10. The anti-pinch window control method as claimed in claim 7, wherein the control module is configured to stop displacement of the end portion of the glass window edge responsive to an infrared sensing module being triggered.

* * * * *